United States Patent
Chiu et al.

(10) Patent No.: US 8,434,884 B2
(45) Date of Patent: May 7, 2013

(54) BACKLIGHT MODULE

(75) Inventors: Chi-Feng Chiu, Hsin-Chu (TW); Yeh-En Chien, Hsin-Chu (TW)

(73) Assignee: Au Optronics Corp., Hsinchu (TW)

(*) Notice: Subject to any disclaimer, the term of this patent is extended or adjusted under 35 U.S.C. 154(b) by 419 days.

(21) Appl. No.: 12/842,481

(22) Filed: Jul. 23, 2010

(65) Prior Publication Data

US 2011/0019389 A1    Jan. 27, 2011

(30) Foreign Application Priority Data

Jul. 24, 2009  (CN) .......................... 2009 1 0160812
Jul. 23, 2010  (CN) .......................... 2010 1 0235092

(51) Int. Cl.
*G09F 13/04*     (2006.01)
*G09F 13/08*     (2006.01)
*F21V 23/00*     (2006.01)

(52) U.S. Cl.
USPC ............... 362/97.1; 362/97.3; 362/249.02; 362/612

(58) Field of Classification Search ........ 362/97.1–97.4, 362/612, 613, 545
See application file for complete search history.

(56) References Cited

U.S. PATENT DOCUMENTS

| | | | |
|---|---|---|---|
| 5,412,495 A | 5/1995 | Kim | |
| 8,300,199 B2* | 10/2012 | Kim | 349/150 |
| 2006/0044828 A1* | 3/2006 | Kim et al. | 362/613 |
| 2006/0110949 A1 | 5/2006 | Jee et al. | |
| 2008/0030645 A1* | 2/2008 | Nam et al. | 349/61 |
| 2008/0051159 A1 | 2/2008 | Kobayashi et al. | |
| 2008/0123016 A1 | 5/2008 | Kwak et al. | |
| 2009/0101897 A1 | 4/2009 | Murphy et al. | |
| 2010/0177498 A1* | 7/2010 | Choi et al. | 362/97.1 |
| 2012/0162967 A1* | 6/2012 | Ida | 362/97.1 |

FOREIGN PATENT DOCUMENTS

| | | | |
|---|---|---|---|
| CN | 2202323 | | 6/1995 |
| CN | 1779517 | | 5/2006 |
| CN | 1779517 A | | 5/2006 |
| CN | 101101392 | | 1/2008 |
| JP | 2003122265 A | * | 4/2003 |
| JP | 2006100319 | | 4/2006 |
| JP | 2009133932 A | * | 6/2009 |
| KR | 2006114880 A | * | 11/2006 |
| TW | 481335 | | 3/2002 |
| TW | 200801679 | | 1/2008 |

OTHER PUBLICATIONS

China Patent Office Action issued on Jan. 18, 2012.

* cited by examiner

*Primary Examiner* — Mariceli Santiago

(74) *Attorney, Agent, or Firm* — WPAT, PC; Justin King

(57) ABSTRACT

An exemplary backlight module is disclosed in the present invention. The backlight module includes a light source module, a main circuit board, a flexible printed circuit board and a bracket. The bracket is made of a conductive material and used for fixing the light source module. The light source module includes at least a light source circuit substrate and a plurality of light sources disposed on the at least a light source circuit substrate. The light source circuit substrate includes a plurality of grounding pads. A part of the grounding pads are electrically contacted to the bracket. The main circuit board includes a grounding terminal. The grounding terminal is electrically connected to another part of the grounding pads through the flexible printed circuit board. The backlight module facilitate the static electricity on the light source module to be grounded, and avoids the light source module being damaged by electro-static discharge.

10 Claims, 3 Drawing Sheets

BACKLIGHT MODULE

BACKGROUND

1. Technical Field

The present invention generally relates to backlight modules and, particularly to a backlight module with static electric protection function.

2. Description of the Related Art

With the development of electronic technology, traditional CRT (cathode ray tube) display devices having large volume are increasingly replaced with LCD modules with advantages of small volume and light weight. The LCD modules are commonly used by consumers and particularly used for monitors, notebook computers, digital cameras, projectors and so on. A LCD module generally includes a LCD panel, a backlight module and a PCB (printed circuit board). The backlight module is an important part of the LCD module, and therefore requirements of the backlight module are progressively growing along the growth of market requirement of the LCD modules.

In addition, in a backlight module, a LED (light-emitting diode) backlight source has advantages of long life, better color and being environmental friendly, so that the LED backlight module has big market potential and will increasingly become a mainstream trend of backlight modules. A traditional LED backlight module includes a LED light bar. The LED light bar includes a circuit substrate and several LEDs disposed on the circuit substrate. The circuit substrate generally has several LED connecting pads corresponding to the several LEDs formed thereon for connecting and fixing the several LEDs.

However, in assembly process of any kinds of LCD modules, either an operator or a machine in operation may generate static electric discharge with high voltage, which would usually cause the damage of LEDs and even the damage of components on the PCB through the circuit of the light bar. In the prior art, a guard band is disposed at a periphery of the circuit substrate of the LED light bar, and a grounded pin is added, so that the static electric on the light bar is directed to a grounded terminal of the PCB. However, with the development trends of electronic devices being light, thin, short and small, considering actual designs of the LED light bar, since the LED connecting pads are so close to the edge of the circuit substrate, and the damage of the LEDs on the LED light bar and components on the PCB resulting from ESD (electrostatic discharge) cannot be effectively avoided by a guard band.

BRIEF SUMMARY

The present invention is directed to provide a backlight module that can effectively solve the issue of components on the backlight module in the prior art being damaged by ESD.

In one aspect, a backlight module comprises: a light source module comprising at least a light source circuit substrate and a plurality of light sources disposed on the at least a light source circuit substrate, wherein the light source circuit substrate includes a plurality of grounding pads; a bracket made of a conductive material, the bracket being for fixing the light source module and electrically connected to a part of the plurality of grounding pads; a main circuit board comprising a grounding terminal; and a flexible printed circuit board electrically connected between another part f the plurality of grounding pads and the grounding terminal.

In an embodiment, the another part of the plurality of grounding pads electrically connected to the flexible printed circuit board are partly electrically connected to the part of the plurality of grounding pads electrically connected to the bracket.

In an embodiment, the plurality of grounding pads are electrically connected to the bracket through a connecting element, wherein the connecting element can be a conductive tape or a conductive foil.

In an embodiment, a part of the bracket is directly contacted with the part of the plurality of grounding pads.

In an embodiment, the bracket is a reflector, and the light source module is positioned through the reflector.

As stated above, in the backlight module of present invention, the grounding pads of the light source module can be connected with the bracket, and also can be connected to the grounding terminal of the main circuit board, so that the static electric generated in the light source module can be grounded. Therefore, components on the light source module can be kept from being damaged by ESD.

In another aspect, a backlight module comprises: a light source module comprising at least a light source circuit substrate and a plurality of light sources disposed on the at least a light source circuit substrate, wherein the light source circuit substrate includes a plurality of grounding pads; and a bracket being made of a conductive material and for fixing the light source module, a part of the plurality of grounding pads being electrically connected to the bracket.

As stated above, in the backlight module of present invention, the grounding pads of the light source module can be connected with the bracket, due to the bracket is made of conductive material, the bracket can absorb the static electric in the light source module through the grounding pads of the light source module. Therefore, components on the light source module can be kept from being damaged by ESD.

In a third aspect, a backlight module comprises a light source module comprising at least a light source circuit substrate and a plurality of light sources disposed on the at least a light source circuit substrate, wherein the light source circuit substrate includes a plurality of grounding pads; a main circuit board comprising a grounding terminal; and a flexible printed circuit board electrically connected between a part of the plurality of grounding pads and the grounding terminal.

As stated above, in the backlight module of present invention, the grounding pads of the light source module can be connected with the grounding terminal of the main circuit board, so as to make the static electric in the light source module grounded. Therefore, components on the light source module can be kept from being damaged by ESD.

In a fourth aspect, a backlight module, comprises a bracket; a light source module disposed on the bracket, the light source module comprising at least a light source circuit substrate and a plurality of light sources disposed on the at least a light source circuit substrate, wherein the light source circuit substrate includes a plurality of grounding pads; a connecting element, one end of the connecting element connected to the bracket, and the other end of the connecting element connected to a part of the plurality of grounding pads, so that the bracket and the part of the plurality of grounding pads are electrically connected, a first grounded conductive path is formed by the bracket, the connecting element and the light source circuit substrate; a flexible printed circuit board having one end electrically connected to another part of the plurality of grounded; and a main circuit board comprising a grounding terminal, wherein the grounding terminal is electrically connected to the other end of the flexible printed circuit board, and a second grounded conductive path is formed by the main circuit board, the flexible printed circuit board and the light source circuit substrate.

As stated above, in the backlight module in the present invention, a part of the grounding pads are connected to the bracket, and another part of the grounding pads are connected to the grounding terminal of the main circuit board through the flexible printed circuit board, so as to make the static electric in the light source module grounded. Therefore, components on the light source module can be kept from being damaged by ESD.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

With reference of the drawings, a backlight module in accordance with an exemplary embodiment of present invention is described as follows.

Figure 1:
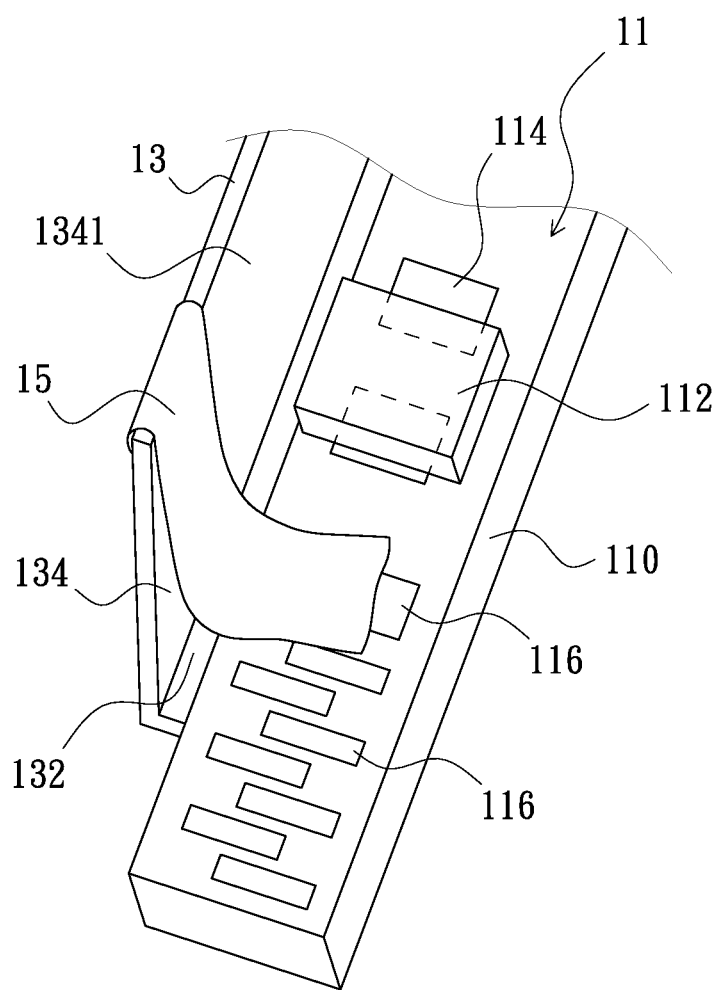
FIG. 1 shows an assembled view of a light source module and a bracket of a backlight module in accordance with an embodiment of the present invention.

Referring to FIG. 1, in an embodiment, a backlight module includes a light source module 11, a bracket 13 for fixing the light source module 11 and a connecting element 15. In the embodiment, the light source module 11 includes a light source circuit substrate 110 and a plurality of light sources 112 disposed on the light source circuit substrate 110. The light source circuit substrate 110 is an elongated board. A plurality of connecting pads 114 and grounding pads 116 are disposed on a surface of the light source circuit substrate 110. An anode and a cathode of the each of the light sources 112 are correspondingly disposed on a pair of connecting pads 114. The light sources 112 are electronically coupled to an inner circuit of the light source circuit substrate 110 through the connecting pads 114. The plurality of light sources 112 includes a plurality of light emitting diodes (LEDS).

Preferably, the bracket 13 is made of conductive material, such as copper, iron, and so on. The bracket 13 is a reflector. The light source module 11 is positioned through the reflector, therefore, in assembly, a light-emitting surface of the light source module 11 can exactly face to a light guide plate (not labeled) of the electronic device. In the embodiment, the bracket 13 is an L-shaped frame that includes a bottom wall 132 and a side wall 134. The light source module 11 is disposed on the bottom wall 132 and is close with the side wall 134, so that the light source module 11 can be held and fixed in the bracket 13. The side wall 134 of the bracket 13 includes a first surface 1341. It should be understood that, the light source module 11 can be fixed in the bracket 13 by glue.

The connecting element 15 is made of a conductor and electrically connects a part of the grounding pads 116 with the bracket 13. In the embodiment, the connecting element 15 is a conductive tape or a conductive foil. The connecting element 15 is connected to the grounding pads 116 on the surface of the light source circuit substrate 110 and is connected with the first surface 1341 of the side wall 134 of the bracket 13, therefore, at least a part of the grounding pads 116 of the light source circuit substrate 110 is electrically coupled to the bracket 13 through the connecting element. Through above disposing, the bracket 13, the connecting element 15 and the grounding pads 116 of the light source circuit board 110 are combined to form a first grounded conductive path.

Figure 2:
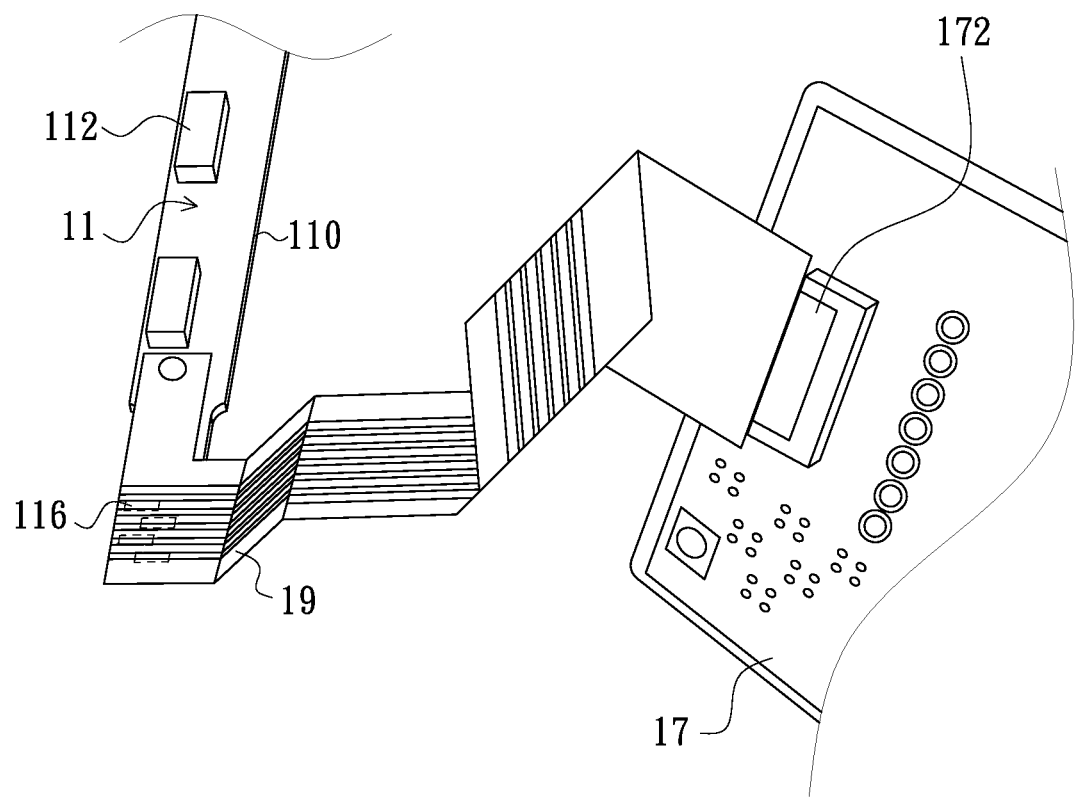
FIG. 2 shows an assembled view of a light source module and a main circuit board of the backlight module in accordance with another embodiment of the present invention.

Referring to FIG. 2, another embodiment of the backlight module is shown. In this embodiment, the backlight module includes above light source module 11, a main circuit board 17 and a flexible printed circuit board 19. Similarly, the light source module 11 includes a light source circuit substrate 110 and a plurality of light sources 112 disposed on the light source circuit substrate 110, and a plurality of grounding pads 116 are disposed on the light source circuit substrate 110. In addition, a grounding terminal 172 is disposed on the main circuit board 17. The flexible printed circuit board 19 is directly electrically connected to the grounding pads 116 disposed on the light source circuit substrate 110 of the light source module 11 and the grounding terminal 172 disposed on the main circuit board 17. Through above connection relationship, the main circuit board 17, the flexible printed circuit board 19 and the light source circuit substrate 110 can be combined to form a second grounded conductive path.

Figure 3:
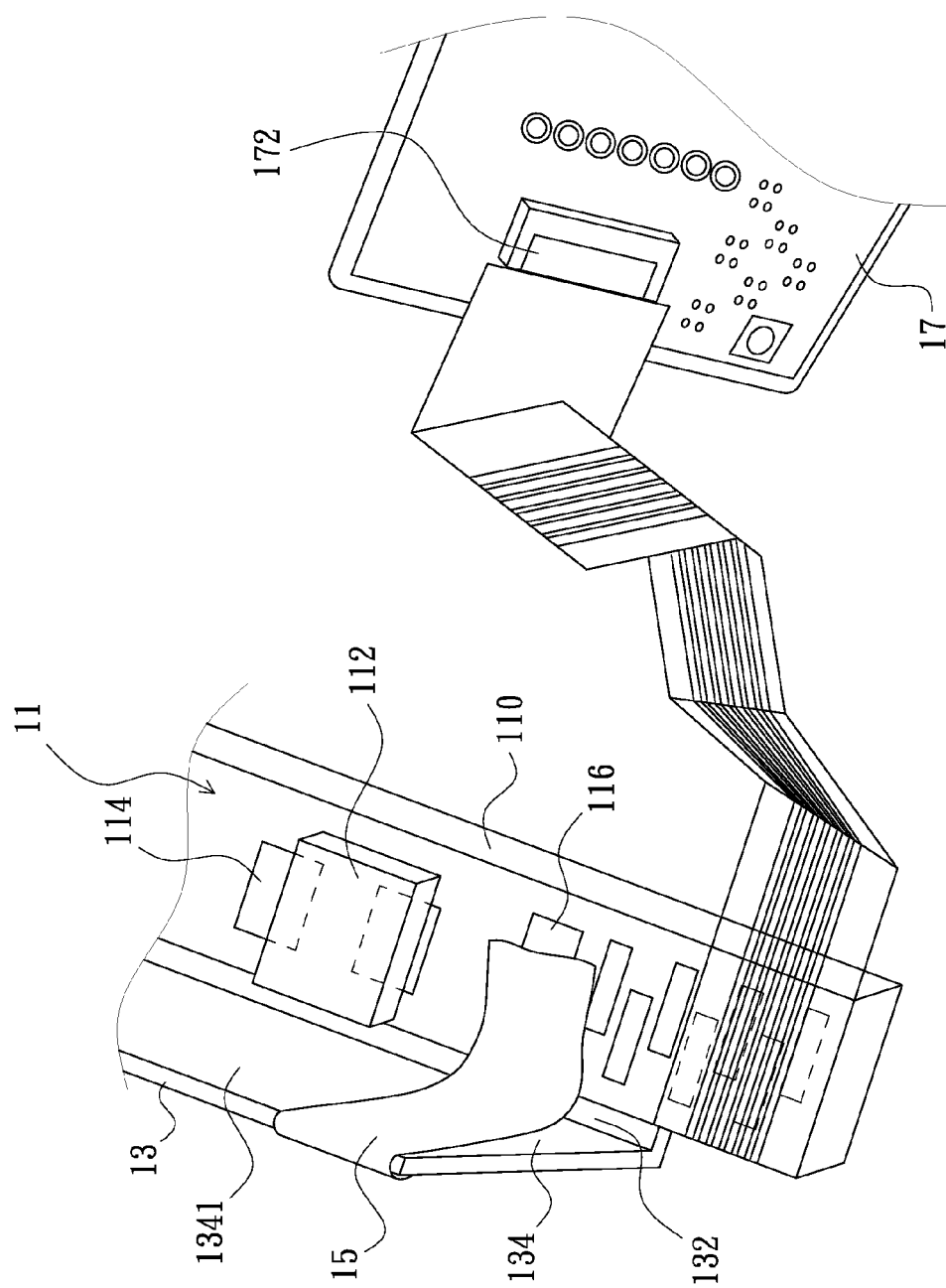
FIG. 3 shows an assembled view of a light source module, a bracket and a main circuit board of a backlight module in accordance with another embodiment of the present invention.

Further referring to FIG. 3, FIG. 3 shows an embodiment that is a combination of embodiments shown in FIGS. 1 and 2. In particular, in this embodiment, the connecting element 15 is electrically connected to a part of the plurality of grounding pads 116 disposed on the light source circuit substrate 110, and another part of the plurality of grounding pads 116 disposed on the light source circuit substrate 110 are electrically connected to the flexible printed circuit board 19. Thus, in the embodiment, there are both grounded conductive paths including a first grounded conductive path formed by the combination of the bracket 13, the connecting element 15 and a part of the grounding pads 116 disposed on the light source circuit substrate 110, and a second grounded conductive path formed by the combination of the main circuit board 17, the flexible printed circuit board 19 and the another part of the grounding pads disposed on light source circuit board 110.

Of course, the grounding pads 116 used by the two grounded conductive paths can include more than one repeating grounding pads 116, or the grounding pads 116 used by the two grounded conductive paths are electrically connected to each other. Thus, the first grounded conductive path and the second grounded conductive path are connected to each other to form a third grounded conductive path.

Otherwise, the embodiments of the present invention can also be implemented in combination with traditional technology. For example, the light source circuit substrate 110 can have a grounded loop disposed thereon as the guard band in prior art. The grounded loop is circled around the light source circuit substrate 110 and electrically connected to the grounding pads 116. Thus, a fourth grounded conductive path is formed by the combination of the grounding pads 16 and the ground loop.

Similarly, the fourth grounded conductive path can also be electrically connected to one or more of the first, the second or the third grounded conductive paths to form another grounded conductive path.

When there is a static electric discharge appearing on the light source module 11, the energy of the static electric may be stored and discharges in an opportune discharging channel. However, a perfect discharging channel for the static electric is usually an object that is easy to be conducted and has a large potential difference with the stored static electric. Thus, if the grounded conductive paths are formed in accordance with above embodiments, the stored static electric may discharges through the grounded conductive paths in most probability. For the first grounded conductive path, due to the bracket 13 is equal to a large charge storage, the static electric stored in the light source module 11 can be discharged to the bracket 13 through the grounding pads 116 electrically connected to the bracket 13. A user can periodically release the redundant charges on the bracket 13 to retain the discharging function of the bracket 13. There are many manners for releasing the redundant charges on the bracket 13, such as waiting for the redundant charges on the bracket 13 neutralized by charges in the air, or making the bracket 13 periodically grounded, or using the third grounded conductive path described in above embodiment for releasing the redundant charges on the bracket 13.

If the third grounded conductive path is used for releasing the redundant charges on the bracket 13, the static electric on the light source module 11 or the redundant charges on the bracket 13 can be conducted to the grounding terminal 172 through the flexible printed circuit board 19 along the second grounded conductive path for charge neutrality.

In addition, if the fourth grounded conductive path is used, the grounded loop is equal to another large charge storage, the static electric released on the grounded loop becomes to be redundant charges on the grounded loop. The redundant charges on the grounded loop can be similarly released by being neutralized by charges in the air, or being grounded through another grounded conductive path described in above embodiment for releasing the redundant charges on the grounded loop.

As stated above, in the backlight module of present invention, the grounding pads 116 of the light source module 11 can be connected with the bracket 13, the grounding terminal 172 of the main circuit board 17 or a metal, so that the static electric generated in the light source module 11 can be grounded. Therefore, the damage caused by ESD can be avoided, and components on the light source module 11 can be kept from being damaged by ESD.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A backlight module, comprising:
   a light source module comprising at least a light source circuit substrate and a plurality of light sources disposed on the at least a light source circuit substrate, wherein the light source circuit substrate includes a plurality of grounding pads;
   a bracket made of a conductive material, the bracket being for fixing the light source module and electrically connected to a part of the plurality of grounding pads;
   a main circuit board comprising a grounding terminal; and
   a flexible printed circuit board electrically connected between another part of the plurality of grounding pads and the grounding terminal;
   wherein a part of the bracket is directly contacted with the part of the plurality of grounding pads.

2. The backlight module as claimed in claim 1, wherein the another part of the plurality of grounding pads electrically connected to the flexible printed circuit board are partly electrically connected to the part of the plurality of grounding pads electrically connected to the bracket.

3. The backlight module as claimed in claim 2, wherein the light source circuit substrate is an elongated board, the light source circuit substrate has a plurality of connecting pads formed thereon for disposing the plurality of light sources.

4. The backlight module as claimed in claim 1, wherein the plurality of grounding pads are electrically connected to the bracket through a connecting element.

5. The backlight module as claimed in claim 4, wherein a connecting element connected between the plurality of grounding pads and the bracket is a conductive tape or a conductive foil.

6. A backlight module, comprising:
   a light source module comprising at least a light source circuit substrate and a plurality of light sources disposed on the at least a light source circuit substrate, wherein the light source circuit substrate includes a plurality of grounding pads;
   a bracket made of a conductive material, the bracket being for fixing the light source module and electrically connected to a part of the plurality of grounding pads;
   a main circuit board comprising a grounding terminal; and
   a flexible printed circuit board electrically connected between another part of the plurality of grounding pads and the grounding terminal;
   wherein the bracket is a reflector, and the light source module is positioned through the reflector.

7. A backlight module, comprising:
   a light source module comprising at least a light source circuit substrate and a plurality of light sources disposed on the at least a light source circuit substrate, wherein the light source circuit substrate includes a plurality of grounding pads;
   a bracket being made of a conductive material and for fixing the light source module, wherein a part of the plurality of grounding pads are electrically connected to the bracket;
   wherein a part of the bracket is directly contacted with the part of the plurality of grounding pads.

8. A backlight module, comprising:
   a bracket;
   a light source module disposed on the bracket and comprising at least a light source circuit substrate and a plurality of light sources disposed on the at least a light source circuit substrate, wherein the light source circuit substrate includes a plurality of grounding pads;
   a connecting element, one end of the connecting element connected to the bracket and the other end of the connecting element connected to a part of the plurality of grounding pads, so that the bracket and the part of the plurality of grounding pads are electrically connected, and a first grounded conductive path is formed by the bracket, the connecting element and the light source circuit substrate;
   a flexible printed circuit board having one end electrically connected to another part of the plurality of grounding pads; and
   a main circuit board comprising a grounding terminal, wherein the grounding terminal is electrically connected to the other end of the flexible printed circuit board, and a second grounded conductive path is formed by the main circuit board, the flexible printed circuit board and the light source circuit substrate;
   wherein a third grounded conductive path is formed between the first grounded conductive path and the second grounded conductive path through the plurality of grounding pads, and the first grounded conductive path is electrically connected to the second grounded conductive path;

wherein the backlight module further comprises a grounded loop disposed on the light source circuit substrate, the grounded loop is circled around the light source circuit substrate and electrically connected to the plurality of grounding pads, and a fourth grounded conductive path is formed by the combination of the plurality of grounding pads and the ground loop.

9. The backlight module as claimed in claim 8, wherein the plurality of light sources includes a plurality of light emitting diodes.

10. The backlight module as claimed in claim 8, wherein the connecting element connected is a conductive tape or a conductive foil.

* * * * *